(12) United States Patent
Vald et al.

(10) Patent No.: US 12,488,139 B2
(45) Date of Patent: Dec. 2, 2025

(54) DATA SERVICES WITH PRIVACY PRESERVATION AND REPEATABILITY

(71) Applicant: INTUIT INC., Mountain View, CA (US)

(72) Inventors: Margarita Vald, Tel Aviv (IL); Yaron Sheffer, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 456 days.

(21) Appl. No.: 17/483,663

(22) Filed: Sep. 23, 2021

(65) Prior Publication Data

US 2023/0093406 A1   Mar. 23, 2023

(51) Int. Cl.
*G06F 21/62* (2013.01)
*G06F 21/31* (2013.01)
*G06F 21/60* (2013.01)

(52) U.S. Cl.
CPC .......... *G06F 21/6245* (2013.01); *G06F 21/31* (2013.01); *G06F 21/602* (2013.01)

(58) Field of Classification Search
CPC ...... G06F 21/6245; G06F 7/582; G06F 21/31; G06F 21/602
See application file for complete search history.

(56) References Cited

U.S. PATENT DOCUMENTS

| | | | | |
|---|---|---|---|---|
| 2016/0335455 A1* | 11/2016 | Mohan | ............... | G06F 16/90335 |
| 2017/0169253 A1* | 6/2017 | Curcio | ............... | G06F 21/6263 |
| 2019/0296914 A1* | 9/2019 | Martin | ...................... | G09C 1/00 |
| 2020/0327252 A1* | 10/2020 | Mcfall | ..................... | G06F 21/78 |
| 2020/0389293 A1* | 12/2020 | Lambert | .............. | H03M 7/3059 |
| 2023/0153411 A1* | 5/2023 | Okuyama | ........... | G06F 21/6245 |
| | | | | 726/6 |

FOREIGN PATENT DOCUMENTS

EP     3401829 A1 *  11/2018   ......... G06F 21/6227

* cited by examiner

*Primary Examiner* — Benjamin E Lanier
(74) *Attorney, Agent, or Firm* — DLA PIPER LLP US (57) ABSTRACT

A processor may receive a request to perform an operation. The processor may generate a seed derived from data required to perform the operation. The processor may generate a perturbation based on inputting the seed into a pseudorandom number generator. The processor may generate the actual result based on performing the operation. The processor may generate a perturbed result, wherein generating the perturbed result may comprise performing a second operation based on the actual result and the perturbation. The processor may return the perturbed result in response to the request.

18 Claims, 6 Drawing Sheets

```
{
    "operation": "average",
    "inputs": [
        55000,
        43000,
        107000,
        64000,
        68733
    ],
    "perturbationRange": 2500,
    "flags": {
        "precision": 2,
        "removeOutliers": true
    }
}
```

502

```
{
    "result": 54007.24,
    "metadata": {
        "outliers": 2
    }
}
```

DATA SERVICES WITH PRIVACY PRESERVATION AND REPEATABILITY

BACKGROUND

End users and computing services often request information that could include sensitive personal or confidential elements. For example, information about salaries for a given type of job in a given area is derived from actual salaries of actual workers, and these workers may prefer that their salaries not be widely shared. In another example, there are legal prohibitions against revealing medical data (e.g., HIPAA), but trends about medical information and public health are often useful even without revealing the specific health information of a given individual. Accordingly, information is often anonymized before being provided to avoid revealing anything that should be kept confidential.

However, in some cases, a data set of interest can be small and changing, which can mean personally identifying data can be inferred. For example, if a user requests a value for average patent attorney salaries in a particular market, and a true average is calculated and returned, this may in itself not reveal a specific person's salary. However, if one person joins the market, and the new average after this person joins is calculated, it may be possible to guess the new person's salary based on the difference between calculated average results before and after the new attorney's start date.

In another example, rule-based systems or models may provide, based on a presentation of aggregated data, insights that are specific to a particular person or business. These aggregated insights run the risk of exposing sensitive information, especially if they are computed over small groups of people or businesses. This risk may be mitigated with a set of rules, but a more effective and technically sound approach may be to develop a service that functionally derives and delivers requested information in a privacy-preserving way.

DETAILED DESCRIPTION OF SEVERAL EMBODIMENTS

Some embodiments described herein can provide a generic tool to obtain aggregates or other mathematical results without revealing sensitive data. To avoid delivering inconsistent results, embodiments described herein may apply additional processing to provide repeatability such that a repeated request for the same information will be subject to the same perturbation. For example, embodiments may generate a seed every time a request is received (e.g., by hashing or some other technique), and use the seed to generate a perturbation that can be applied to the results of performing the requested operation. The techniques used to generate the seed may ensure that future requests for the same operation with the same input data will cause the same seed to be generated.

Consider again the example wherein a user requests a value for average patent attorney salaries in a particular market, and a true average is calculated. Starting from raw data (e.g., the true salaries in the group), the disclosed embodiments can compute the requested result (e.g., average salary), perturb the result of the computation, and return the perturbed result. A straightforward way to perturb a result is to use a random number generator (RNG) to obtain a number and then add or subtract that number from the result. However, any time the same request is repeated, the RNG would generate a different number and obtain a different perturbation. For example, attempting the same task on different days, or even simply refreshing a browser in a web environment, could trigger the application of different perturbations. The result is semi-deterministic, in the sense that when the same input numbers are provided by the same caller, the resulting metric remains the same. However, if one of the input numbers is modified, or if used by a different caller (e.g., different AppID), the result will change.

However, because the same seed is used for subsequent requests for the same data from the same requester, the disclosed embodiments can provide results in a manner that is consistent per requesting user/device and request. This can ensure repeatability in the event of network issues or other repetitious requests particular to a computing environment. Furthermore, the disclosed embodiments enable such repeatability with stateless computing, so that results need not be stored and retrieved later, reducing computing storage requirements and thereby conserving computing resources. As described in detail below, these and/or additional advantages may be realized by dedicated processing services and/or by embedding functionality within other services.

Figure 1:
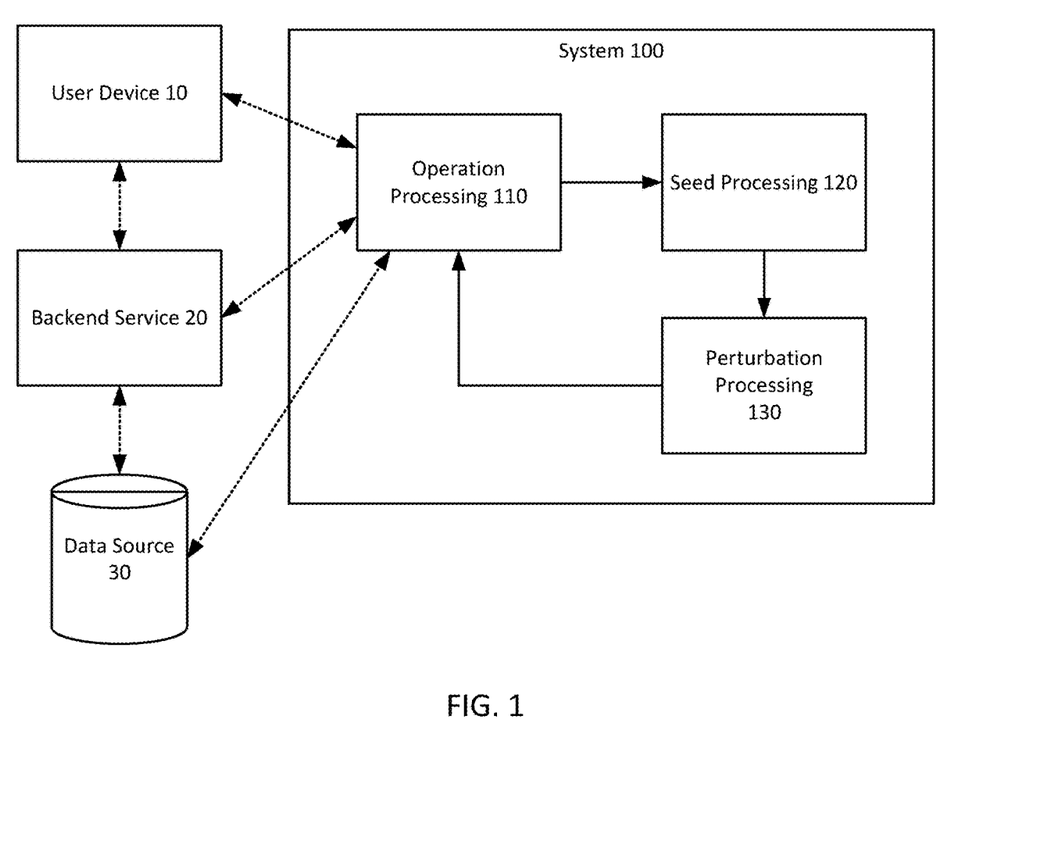
FIG. 1 shows an example data service system according to some embodiments of the disclosure.

FIG. 1 shows an example data service system 100 according to some embodiments of the disclosure. System 100 may include a variety of hardware, firmware, and/or software components that interact with one another and with user device 10, backend service 20, and/or data source 30. For example, system 100 can include operation processing 110, seed processing 120, and/or perturbation processing 130, each of which may be implemented by one or more computers (e.g., as described below with respect to FIG. 6). As described in detail below, user device 10 can generate an initial request for data (e.g., a request to see the average salaries of local patent attorneys), which may be sent to backend service 20 for handling (e.g., through the Internet or another network or networks, or backend service 20 may be a local component of user device 10). In some embodiments, backend service 20 and system 100 may be integrated so that the request goes directly to system 100, or in other embodiments backend service 20 may request processing from system 100. Operation processing 110 of system 100 and/or backend service 20 can obtain data (e.g., the requested salary data) from data source 30. Seed processing 120 can generate seeds, and perturbation processing 130 can generate perturbations from those seeds. Operation processing 110 can use the perturbations to generate perturbed results which can be returned to user device 10 and/or backend service 20 (which may, in turn, give the perturbed results to user device 10). FIGS. 2-5 illustrate the functioning of system 100 in detail.

User device 10, backend service 20, data source 30, system 100, and individual elements of system 100 (operation processing 110, seed processing 120, and perturbation processing 130) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while operation processing 110, seed processing 120, and perturbation processing 130 are depicted separately, any combination of these elements may be part of a combined hardware, firmware, and/or software element. Moreover, while one user device 10, one backend service 20, and one data source 30 are shown, in practice, there may be multiples of any of these elements and/or these elements may be combined or co-located.

Figure 2:
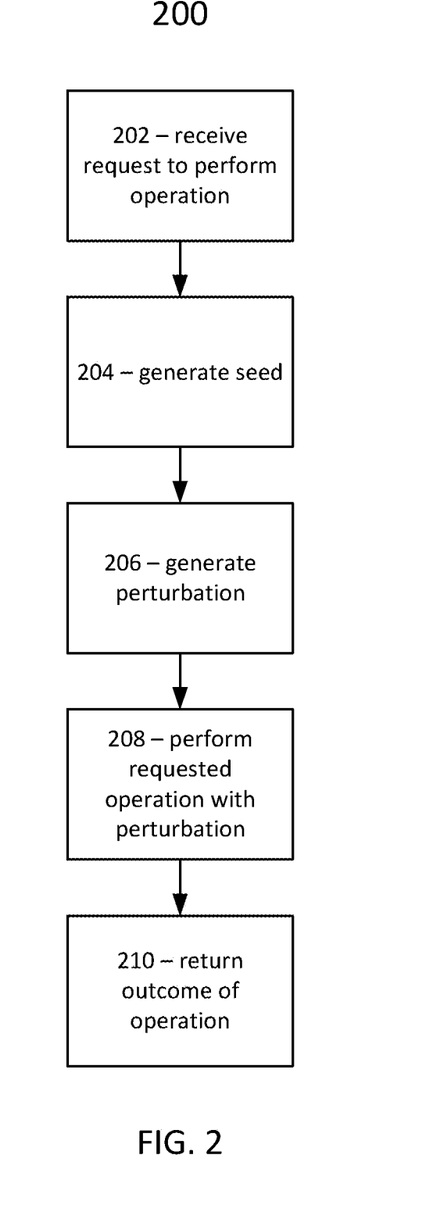
FIG. 2 shows an example data generation process according to some embodiments of the disclosure.

FIG. 2 shows an example data generation process 200 according to some embodiments of the disclosure. System 100 can perform process 200 to perturb the outcome of an operation in a consistent, repeatable, yet stateless manner.

At 202, system 100 can receive a request to perform an operation from backend service 20 or other source. For example, backend service 20 can receive a request from a customer (e.g., via user device 10) for information that involves determination of some mathematical result. To illustrate the processing, assume backend service 20 is a server for a financial services app and/or website, and backend service 20 serves a user interface (UI) to user device 10, which displays the UI (e.g., in a browser or dedicated app). The customer can request information about the average salary for a given profession in a given area at user device 10 using the UI, and user device 10 can send this request to backend service 20. In some embodiments, the request may proceed directly from user device 10 to system 100 (e.g., because backend service 20 is a component of user device 10, backend service 20 is a component of system 100, or user device 10 interacts with system 100 without using backend service 20 as an intermediary).

In some embodiments, backend service 20 can obtain data to service the request from data source 30, such as all the salaries for the given profession in the given area. Backend service 20 can then send the data and the requested calculation (e.g., calculate the average) to system 100. In other embodiments, backend service 20 can send information describing the requested calculation to system 100, and system 100 can obtain the data to service the request from data source 30. Backend service 20 can also send a proposed perturbation range value (R) or a maximum acceptable R in some embodiments. In other embodiments, system 100 may establish R without input from backend service 20. In some embodiments, backend service 20 may also send some identifying information, such as a customer ID of the requesting customer or user device 10.

At 204, system 100 can generate a seed derived from data required to perform the operation. To generate the seed, system 100 can apply a hash function to some or all inputs received at 202 and/or the result of the requested processing that is based on the inputs received at 202. For example, the inputs that are hashed can include all of the data to service the request (e.g., all of the salaries obtained in response to the request) and/or a result of the requested operation (e.g., an average of the salaries obtained in response to the request). In some embodiments, the inputs that are hashed can also include the identifying information.

In some embodiments, system 100 can add other data to the inputs and/or results that are hashed, such as adding a secret value unique to the customer or unique to the system 100, or any other specific secret value from any known or novel secret management system. System 100 may add this additional data to make it harder for external actors to reproduce the hash (e.g., salary and/or user ID data may be available elsewhere and/or may be guessed at, but local secret information may be harder to derive or guess from outside system 100). Essentially any data can be added, as long as the data stays consistent over time so that subsequent iterations of process 200 for the same request will use the same data.

System 100 can hash the data, and the resulting hash value can be used to seed the RNG. System 100 can generate the seed every time process 200 is performed, but by using the same hash function each time, system 100 will generate the same seed if it receives the same inputs at 202. Accordingly, system 100 can reproduce the seed for subsequent identical requests, assuming the data returned in response to the request does not change, and does not need to store a record of the previous seed or any other state information to do so. If the identifying information is part of the hash input, the seed will be the same each time the same user requests the same information. If the identifying information is not included in the hash input, the seed will be the same time any user requests the same information.

At 206, system 100 can generate a perturbation by inputting the seed into a random number generator. The RNG can be a pseudorandom number generator (also known as a deterministic random bit generator) such that any other seed having a same value as the seed will produce the same perturbation. For example, system 100 can use the RNG, with the hash value from 202 as a seed, to generate a perturbation adhering to the requested or established R value. The RNG may be configured to output a perturbation value between −R and R. Because system 100 produces the same hash value from the same information request each time it is received, the RNG will be seeded with the same value for the same information request each time it is received. Accordingly, the RNG will generate the same perturbation each time. This is different from the more common use of an RNG, where the seed comes from an environmental factor (e.g., computer clock, locally available noise signal, etc.) and therefore the output of the RNG is nearly random.

As a result of the above processing, as long as the returned set of data requested remains the same, the hash generated will be the same, and the output of the RNG will be the same. If the data changes (e.g., if some people move or quit their jobs or are hired, causing a new distribution of salaries), the hash will change, resulting in a new perturbation value. However, subsequent requests after that change will use the new perturbation value until the data changes again.

At 208, system 100 can perform the operation to thereby generate an actual result. Note that while this step is indicated as occurring after the perturbation generation in this image for ease of explanation, it can be performed at any time after the request is received at 202. For example, if the result of processing is hashed, this operation may be performed prior to the hashing described above. When the actual result has been determined and the hash is available, system 100 can perturb the actual result by performing a second operation using the actual result and the perturbation, thereby generating a perturbed result. In some embodiments, the data required to perform the operation includes a plurality of numeric values, and the operation includes a mathematical calculation using the plurality of numeric values, Accordingly, the second operation can comprise adding the perturbation to the second result or subtracting the perturbation from the second result. For example, system 100 can perform the requested calculation (e.g., finding the average of the salaries provided at 202) and modify the outcome by the perturbation value determined at 206. For example, system 100 can add the perturbation to the outcome or subtract the perturbation value from the outcome.

At 210, system 100 can return the perturbed result in response to the request. For example, system 100 can return the outcome of the operation, as modified by the perturbation value, to backend service 20, user device 10, or any other source that made the request at 202. The data returned at this point may be safe to share publicly without exposing sensitive information, due to the perturbation, and may also be repeatable for future identical requests without saving state information.

Without saving a state, system 100 can provide the same perturbed result in response to future requests having the same request parameters (e.g., same operation requested on same data set, same requester, etc.). For example, consider a situation wherein process 200 is repeated, and system 100 receives a second request to perform the operation at 202. At 204, system 100 can generate a second seed derived from the data required to perform the operation and/or the result of the operation. At 206, system 100 can generate a second perturbation by inputting the second seed into the random number generator. If the data received at 202 is the same as a previous iteration of process 200 that generated a first seed from a first request, the first seed and the second seed are the same. At 208, system 100 can perform the operation in response to the second request to thereby generate the actual result and perturb the actual result by performing a third operation using the actual result and the second perturbation, thereby generating the perturbed result. The perturbed result returned in response to the second request at 210 will be the same perturbed result as was returned in response to the first request previously. This happens because, for each of the first and the second request, system 100 receives the same information, and generating the seed comprises hashing the same portions of the same information. As long as the received data is the same, the seed will be the same, the outcome of the operation will be the same, and the perturbation will be the same. Thus, there is no need to save a state if such state retention is not desired for some other purpose aside from that of process 200.

Figure 3:
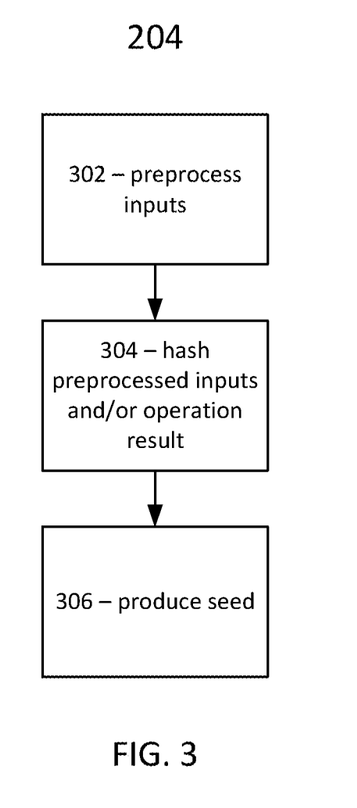
FIG. 3 shows an example seed generation process according to some embodiments of the disclosure.

FIG. 3 shows an example seed generation process 204 according to some embodiments of the disclosure. For example, system 100 may perform seed generation process 204 after receiving a request at 202 in process 200, as described above.

As described above, system 100 can receive a request to perform an operation, and the request can include data required to perform the operation and/or system 100 can obtain such data in response to the request. Furthermore, system 100 can receive and/or obtain additional data such as requester identifying data and/or secret information. In some embodiments, at 302, system 100 can preprocess the data required to perform the operation, the result of the operation performed, and/or the additional data. Preprocessing can include removing outliers from the data required to perform the operation and/or sorting, ordering, or otherwise arranging the data required to perform the operation. For example, if system 100 has been asked to calculate an average and supplied with 100 numbers, 99 of which are two-digit numbers and one of which is a nine-digit number, system 100 may remove the nine-digit number as an outlier. Also, to consistently generate hashes from consistent data, system 100 may arrange the data according to some predefined scheme, such as in ascending order, descending order, etc.

At 304, system 100 can generate a hash based on a result of the operation performed using the data obtained at 202 or, if the data has been preprocessed at 302, the preprocessed data. The data that is hashed can include data required to perform the operation (preprocessed or not, depending on embodiment), an outcome of the operation using the data required to perform the operation, data particular to the requester of the operation (e.g., one or more of a customer ID, an app ID, an ID of the backend service 20 and/or user device 10, etc.), and/or other secret data (e.g., a secret associated with the requester that could be generated upon a first request by the caller). System 100 can use any known, novel, public, or proprietary hashing technique, as long as system 100 uses the same hashing technique for every operation request.

At 306, system 100 can produce the seed as the hashed value generated at 304. As described above, this seed can be used to generate a perturbation. Specific techniques for using the seed to generate the perturbation are described with respect to FIG. 4.

Figure 4:
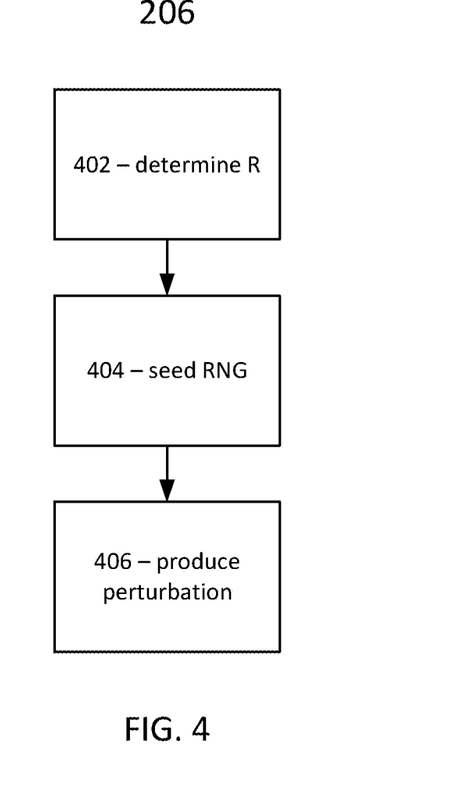
FIG. 4 shows an example perturbation generation process according to some embodiments of the disclosure.

FIG. 4 shows an example perturbation generation process 206 according to some embodiments of the disclosure. For example, system 100 may perform perturbation generation process 206 after performing seed generation process 204 in process 200, as described above.

At 402, system 100 can determine R for the perturbation. For example, in some cases system 100 can receive data defining R for the perturbation, which may be included in the request received at 202, may be predefined, or may otherwise be specified externally to the operations of process 200. For example, the request could include a value for R or an acceptable range for R (e.g., 5% (or some other percentage) of the median or expected value of the data required to perform the operation).

In some cases, system 100 may itself determine R for the perturbation. For example, system 100 can select R based on at least one of a type of the operation, a quantity of the data required to perform the operation, a range of the data required to perform the operation, and a size of the data required to perform the operation. For example, R could be selected to be 5% (or some other percentage) of the median or expected value of the data required to perform the operation.

In some embodiments, system 100 may apply one or more rules to the data required to perform the operation to determine what R to use. For example, for a small set of inputs, system 100 may choose a large perturbation. For a large set of inputs, system 100 may choose a small perturbation (e.g., 5 salaries–R=5000, 100 salaries–R=500). Also, while embodiments described herein can be stateless such that system 100 does not need to keep previous results to get the same seed in the future, some embodiments may preserve states to allow fine tuning of R. For example, based on the change in inputs over time, R may be tuned accordingly. A small change in input values may justify a small perturbation value. A large change in input values may justify a large perturbation value. System 100 can look at past state inputs, identify a difference between past state inputs and current inputs, and select R accordingly.

At 404, system 100 can seed the RNG. This can include configuring the random number generator to produce the perturbation within the range R (if R is to be specified) and inputting the seed obtained as described above.

At 406, system 100 can execute the seeded RNG and thereby produce the perturbation. As described above, this perturbation can be used to modify the outcome of an operation (e.g., added thereto or subtracted therefrom).

Figure 5:
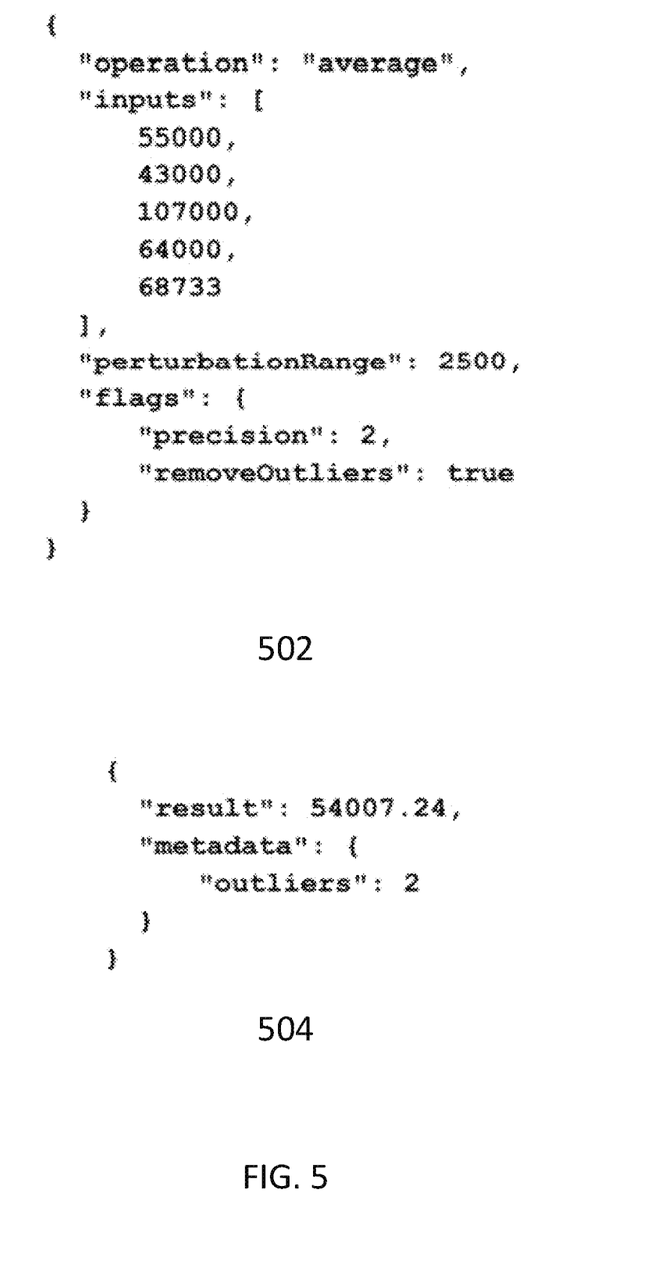
FIG. 5 shows an example set of data inputs to and outputs from the system according to some embodiments of the disclosure.

FIG. 5 shows an example set of data inputs 502 to and outputs 504 from system 100 that is performing process 200 according to some embodiments of the disclosure. The illustrated inputs 502 and outputs 504 provide an example of how process 200 can be triggered and what its outcome may be.

For example, as described above, system 100 can receive a request to perform an operation from backend service 20 or other source 202. Inputs 502 can be a portion of such a request, or an entire such request, or such a request can be in a different form from that illustrated but may include similar types of data. In the example inputs 502, which contain specific values as examples only and are not intended to be limiting to those values, an "operation" is specified ("average"), several "inputs" to be operated on are given (55000, 43000, 107000, 64000, and 68733), a "perturbationRange" (R) is defined ("2500"), and "flags" are set ("precision: 2" and "removeOutliers: true"). In some embodiments, the precision flag can define a precision of the perturbation value and the final result, while in other embodiments it may be omitted.

System 100 can receive inputs 502 as part of process 200. In accordance with the details of process 200 given above, system 100 can preprocess the inputs (e.g., removing the outliers 68733 and 107000 and ordering the inputs in ascending order, where outliers are determined using any known or proprietary methodology), hash the preprocessed inputs and other data (not shown) such as a userID and/or secret to form a seed, provide the seed and the R=2500 to the RNG, receive a perturbation from the RNG (here, the perturbation is 7.24), perform the operation (the average of 43000, 55000, and 64000 is 54000), and perturb the results (54000+7.24=54007.24). In some embodiments, system 100 can preprocess the inputs (e.g., removing the outliers 68733 and 107000 and ordering the inputs in ascending order, where outliers are determined using any known or proprietary methodology), perform the operation (the average of 43000, 55000, and 64000 is 54000), hash the result of performing the operation and other data (not shown) such as a userID and/or secret to form a seed, provide the seed and the R=2500 to the RNG, receive a perturbation from the RNG (here, the perturbation is 7.24), and perturb the results (54000+7.24=54007.24).

After performing the above processing, system 100 can provide output 504 at 210 to backend service 20, user device 10, or any other source that made the request at 202. Output 504 includes the perturbed result (54007.24) and metadata (e.g., the number of outliers removed (2)). In some embodiments, output 504 may be hashed cryptographically or otherwise encrypted or protected so that external attackers cannot deduce the perturbation value and remove it or otherwise gain access to sensitive data.

Figure 6:
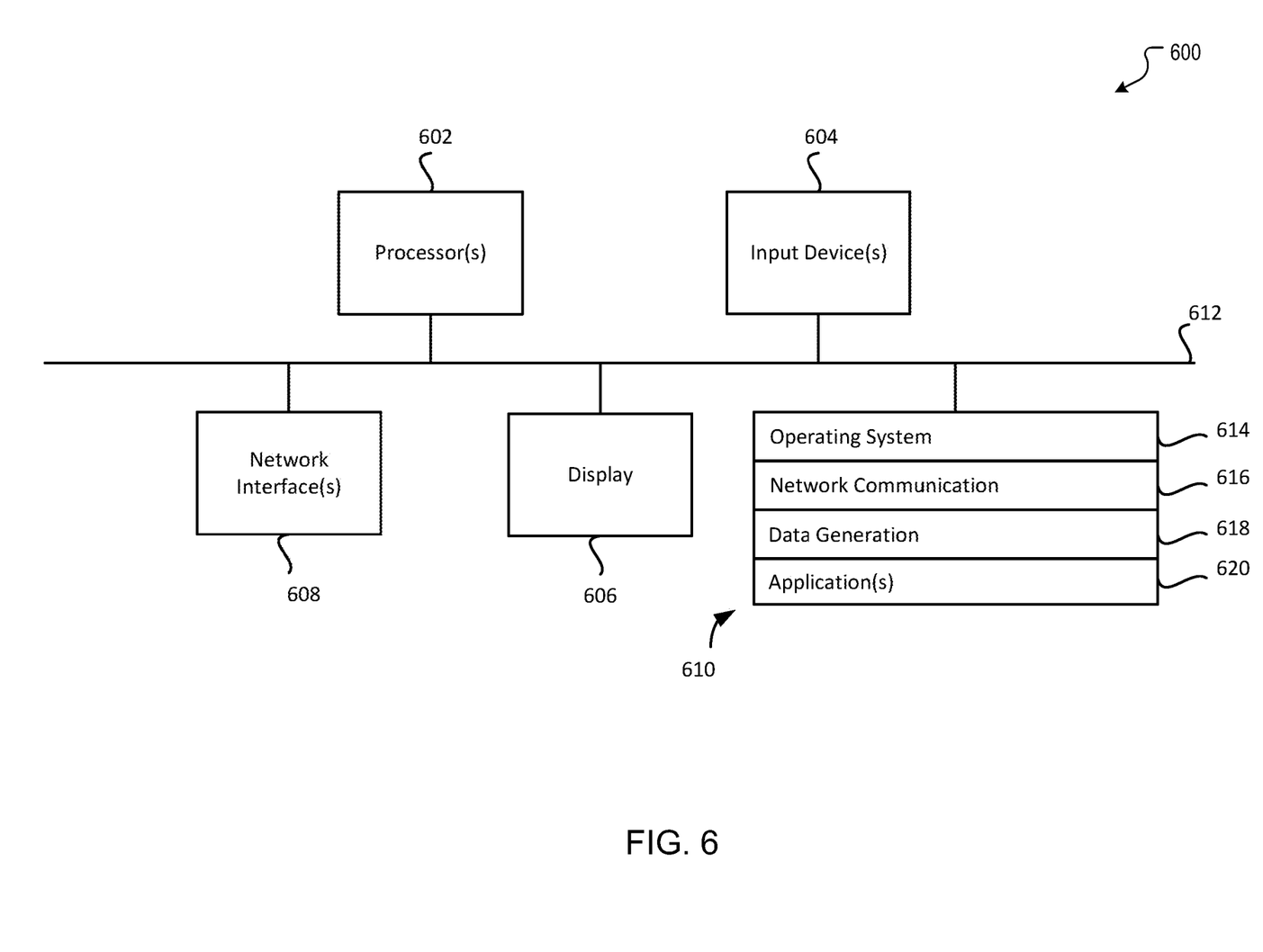
FIG. 6 shows a computing device according to some embodiments of the disclosure.

FIG. 6 shows a computing device 600 according to some embodiments of the disclosure. For example, computing device 600 may function as system 100 or any portion(s) thereof, or multiple computing devices 600 may function as system 100.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

Data generation 618 may include the system elements and/or the instructions that enable computing device 600 to perform the processing of system 100 as described above. Application(s) 620 may be an application that uses or implements the outcome of processes described herein and/ or other processes. For example, application(s) 620 may use data generated as described above, for example by displaying in a UI and/or for performing additional processing in other services and/or apps. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a backend component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

For example, while the above description was presented in the context of computing an average for ease of explanation, it should be understood that any computing operation can be performed according to the processing described above. To give another example, a request may be to find out what percentile a user is within the inputs. System 100 can get the input for the user and a set of values for comparison. System 100 can compute the percentile, compute the hash, and perturb the percentile value. Any computing operation depending on multiple values can be done with the approach described herein. Also, the above description was presented in the context of a system 100 performing the disclosed processing, but it should be understood that since the basic implementation is stateless, processing may be provided as a function as a service, on demand. Moreover, service instances can be implemented anywhere. Alternatively, system 100 can be deployed as a standard service.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
    receiving, by a processor, a first request to perform an operation and one or more data particular to a requester of the first request;
    preprocessing, by the processor, one or more data required to perform the operation by identifying and removing one or more outliers in the data;
    generating, by the processor, a seed derived from the preprocessed data required to perform the operation, wherein one or more future requests for the same operation with the same data will cause the same seed to be generated, wherein generating the seed comprises hashing at least a portion of the data required to perform the operation and the data particular to the requester of the operation, wherein the data particular to the requester of the operation comprises at least a secret value unique to the requester of the operation and locally held by the processor;

determining, by the processor, a range for a perturbation by comparing at least one previous data used to previously perform the operation and the one or more data required to perform the operation and determining the range in accordance with a result of the comparing;

generating, by the processor, the perturbation by inputting the seed into the pseudorandom number generator, the generating the perturbation comprising configuring the pseudorandom number generator to produce the perturbation within the range, wherein one or more future requests for the same operation with the same data will cause the same perturbation to be generated;

generating, by the processor, an actual result based on performing the operation;

generating, by the processor, a perturbed result, wherein generating the perturbed result comprises performing a second operation based on the actual result and the perturbation; and returning, by the processor, the perturbed result in response to the first request without having prior knowledge about state information associated with one or more previous requests.

2. The method of claim 1, wherein generating the seed comprises hashing at least a portion of the data required to perform the operation or hashing at least the actual result.

3. The method of claim 1, wherein the data required to perform the operation includes a plurality of numeric values, and the operation includes a mathematical calculation using the plurality of numeric values.

4. The method of claim 1, wherein the second operation comprises adding the perturbation to the second result or subtracting the perturbation from the second result.

5. The method of claim 1, further comprising receiving, by the processor, data defining a range for the perturbation, wherein the generating the perturbation comprises configuring the random number generator to produce the perturbation within the range.

6. The method of claim 1, further comprising determining, by the processor, a range for the perturbation based on at least one of a type of the operation, a quantity of the data required to perform the operation, a range of the data required to perform the operation, and a size of the data required to perform the operation, wherein the generating the perturbation comprises configuring the random number generator to produce the perturbation within the range.

7. The method of claim 1, further comprising:
receiving, by the processor, a second request to perform the operation, wherein at least a portion of the second request is the same as an equivalent portion of the first request;
generating, by the processor, a second seed derived from the data required to perform the operation;
generating, by the processor, a second perturbation by inputting the second seed into the pseudorandom number generator, wherein the seed and the second seed are the same;
generating, by the processor, the actual result based on performing the operation in response to the second request;
generating, by the processor, the perturbed result, wherein generating the perturbed result comprises performing a third operation based on the actual result and the second perturbation;
returning, by the processor, the perturbed result in response to the second request.

8. The method of claim 7, further comprising:
receiving, by the processor, data particular to a requester of the operation with the first request, wherein generating the seed comprises hashing at least a portion of the data required to perform the operation and the data particular to the requester of the operation that was received with the request; and
receiving, by the processor, the data particular to the requester of the operation with the second request, wherein generating the second seed comprises hashing at least a portion of the data required to perform the operation and the data particular to the requester of the operation that was received with the second request.

9. A system comprising:
a processor; and
a non-transitory memory in communication with the processor and storing instructions that, when executed by the processor, cause the processor to perform processing comprising:
receiving a first request to perform an operation and one or more data particular to a requester of the first request;
preprocessing one or more data required to perform the operation by identifying and removing one or more outliers in the data;
generating a seed derived from the preprocessed data required to perform the operation, wherein one or more future requests for the same operation with the same data will cause the same seed to be generated, wherein generating the seed comprises hashing at least a portion of the data required to perform the operation and the data particular to the requester of the operation, wherein the data particular to the requester of the operation comprises at least a secret value unique to the requester of the operation and locally held by the processor;
determining a range for a perturbation by comparing at least one previous data used to previously perform the operation and the one or more data required to perform the operation and determining the range in accordance with a result of the comparing;
generating the perturbation by inputting the seed into the pseudorandom number generator, the generating the perturbation comprising configuring the pseudorandom number generator to produce the perturbation within the range, wherein one or more future requests for the same operation with the same data will cause the same perturbation to be generated;
generating an actual result based on performing the operation;
generating a perturbed result, wherein generating the perturbed result comprises performing a second operation based on the actual result and the perturbation;
returning the perturbed result in response to the first request without having prior knowledge about state information associated with one or more previous requests.

10. The system of claim 9, wherein generating the seed comprises hashing at least a portion of the data required to perform the operation or hashing at least the actual result.

11. The system of claim 9, wherein the data required to perform the operation includes a plurality of numeric values, and the operation includes a mathematical calculation using the plurality of numeric values.

12. The system of claim 9, wherein the second operation comprises adding the perturbation to the second result or subtracting the perturbation from the second result.

13. The system of claim 9, wherein the processing further comprises receiving data defining a range for the perturbation, wherein the generating the perturbation comprises configuring the pseudorandom number generator to produce the perturbation within the range.

14. The system of claim 9, wherein the processing further comprises determining a range for the perturbation based on at least one of a type of the operation, a quantity of the data required to perform the operation, a range of the data required to perform the operation, and a size of the data required to perform the operation, wherein the generating the perturbation comprises configuring the pseudorandom number generator to produce the perturbation within the range.

15. The system of claim 9, wherein the processing further comprises:
    receiving a second request to perform the operation, wherein at least a portion of the second request is the same as an equivalent portion of the first request;
    generating a second seed derived from the data required to perform the operation;
    generating a second perturbation by inputting the second seed into the pseudorandom number generator, wherein the seed and the second seed are the same;
    generating the actual result based on performing the operation in response to the second request;
    generating the perturbed result, wherein generating the perturbed result comprises perturbing the actual result by performing a third operation based on the actual result and the second perturbation;
    returning the perturbed result in response to the second request.

16. The system of claim 15, wherein the processing further comprises:
    receiving data particular to a requester of the operation with the first request, wherein generating the seed comprises hashing at least a portion of the data required to perform the operation and the data particular to the requester of the operation that was received with the request; and
    receiving the data particular to the requester of the operation with the second request, wherein generating the second seed comprises hashing at least a portion of the data required to perform the operation and the data particular to the requester of the operation that was received with the second request.

17. A method comprising:
    receiving, by a processor, a request to perform an operation and one or more data particular to a requester of the request;
    preprocessing, by the processor, one or more data required to perform the operation by identifying and removing one or more outliers in the data;
    performing, by the processor, the operation to thereby generate an actual result, the operating including a mathematical calculation using a plurality of numeric values;
    hashing, by the processor, the data particular to a requester of the operation and at least one of the actual result or the plurality of numeric values required to perform the operation to produce a seed, wherein one or more future requests for the same operation with the same plurality of numeric values will cause the same seed to be generated, wherein the data particular to the requester of the operation comprises at least a secret value unique to the requester of the operation and locally held by the processor;
    determining, by the processor, a range for a perturbation by comparing at least one previous data used to previously perform the operation and the one or more data required to perform the operation and determining the range in accordance with a result of the comparing;
    generating, by the processor, the perturbation by inputting the seed into the pseudorandom number generator, the generating the perturbation comprising configuring the pseudorandom number generator to produce the perturbation within the range, wherein one or more future requests for the same operation with the same data will cause the same perturbation to be generated;
    generating, by the processor, a perturbed result, wherein generating the perturbed result comprises performing a second operation based on the actual result and the perturbation;
    returning, by the processor, the perturbed result in response to the request without having prior knowledge about state information associated with one or more previous requests.

18. The method of claim 17, further comprising:
    receiving, by the processor, a second request to perform the operation;
    performing, by the processor, the operation in response to the second request to thereby generate the actual result;
    hashing, by the processor, data particular to a second requester of the operation and at least one of the actual result or the plurality of numeric values required to perform the operation to produce a second seed;
    generating, by the processor, a second perturbation by inputting the second seed into the pseudorandom number generator, wherein the seed and the second seed are the same;
    generating, by the processor, the actual result based on performing a third operation using the actual result and the second perturbation;
    returning, by the processor, the perturbed result in response to the second request.

* * * * *